United States Patent [19]

Ulvila

[11] Patent Number: 4,511,905
[45] Date of Patent: Apr. 16, 1985

[54] STYLUS RECORDER LINEARIZED DRIVE SYSTEM

[75] Inventor: Richard M. Ulvila, Salem, N.H.

[73] Assignee: Centronics Data Computer Corporation, Hudson, N.H.

[21] Appl. No.: 430,506

[22] Filed: Sep. 30, 1982

[51] Int. Cl.³ .......................... G01D 15/18; B41J 3/04
[52] U.S. Cl. .................................. 346/140 A; 346/29; 346/139 R; 400/17; 400/18
[58] Field of Search ................. 346/29, 139 R, 140 A; 178/30; 400/17, 18, 110, 111, 126; 318/135, 593, 632, 687

[56] References Cited

U.S. PATENT DOCUMENTS

| | | | |
|---|---|---|---|
| 3,349,176 | 10/1967 | Ascoli | 178/30 |
| 3,449,754 | 6/1969 | Stutz | 346/29 |
| 3,564,378 | 2/1971 | Engle | 318/576 |
| 3,940,676 | 2/1976 | Dudley | 318/612 |
| 4,150,902 | 4/1979 | Brescia | 400/17 |

OTHER PUBLICATIONS

Electronics, "Electronically Controlled Typewriter Stylus Offers Wide Variety in Font Style and Size," R. T. Gallagher, Feb. 10, 1982 issue, pp. 86 and 88.

Primary Examiner—E. A. Goldberg
Assistant Examiner—Gerald E. Preston
Attorney, Agent, or Firm—Henry D. Pahl, Jr.

[57] ABSTRACT

In the calligraphic printing apparatus disclosed herein, a writing stylus is carried by a flexing suspension including a pair of generally orthogonal arms, each arm being driven by a respective servo system which responds to stored data representing characters to be written. The naturally arcuate path defined by each arm is substantially linearized by mixing into the drive signal for each servo system a compensating signal which is a function of the absolute value of the position signal controlling the servo system for the other arm.

4 Claims, 5 Drawing Figures

STYLUS RECORDER LINEARIZED DRIVE SYSTEM

BACKGROUND OF THE INVENTION

The present invention relates to a calligraphic character printer and more particularly to a stylus drive system useful in performing writing using a parallelogram stylus suspension system.

Calligraphic character writing systems are known in which a pen or stylus, together with driving servo mechanisms are transported on a carriage along successive character positions. As each position is traversed, the servo mechanisms are energized to effect tracing out of the desired character. Such devices are described for example in U.S. Pat. Nos. 3,182,126; 3,342,936; and 3,349,176 to Ascoli et al; and U.S. Pat. No. 4,150,902 to Brescia. A related form of graphical plotter is shown in U.S. Pat. No. 3,449,754 to Stutts. The present invention pertains to an improved implementation of the general scheme in the Brescia patent.

Among the several objects of the present invention may be noted the provision of a high speed calligraphic character writer; the provision of such a character writer in which writing is effected from a carriage while the carriage is in motion; the provision of such a writer in which writing is performed by a stylus driven in transverse directions by a pair of servomotors carried on a carriage which is moving at a freely selectable velocity; the provision of such a system which is highly reliable and which is of relatively simple and inexpensive construction. Other objects and features will be in part apparent and in part pointed out hereinafter.

SUMMARY OF THE INVENTION

Briefly, the calligraphic character printer of the present invention involves a stylus which is movable mounted relative to a print head assembly on a flexing suspension system which includes at least a pair of generally orthogonal arms. A drive transducer associated with each arm operates to move the stylus along an arc defined essentially by the length of the other arm.

Signals representing stylus position along orthogonal axes relative to the head assembly are generated from stored digital data and a servo amplifier energizes each drive transducer in response to the difference to the respective position signal and a respective feedback signal. Associated with each drive transducer or main control signal path is a means for generating a compensation signal which is an approximate function of the absolute value of the position signal corresponding to the other drive transducer. The compensation signal is mixed into the difference value which controls the energization of the respective drive transducer so that the stylus is positioned as a more linear function of the position voltages.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
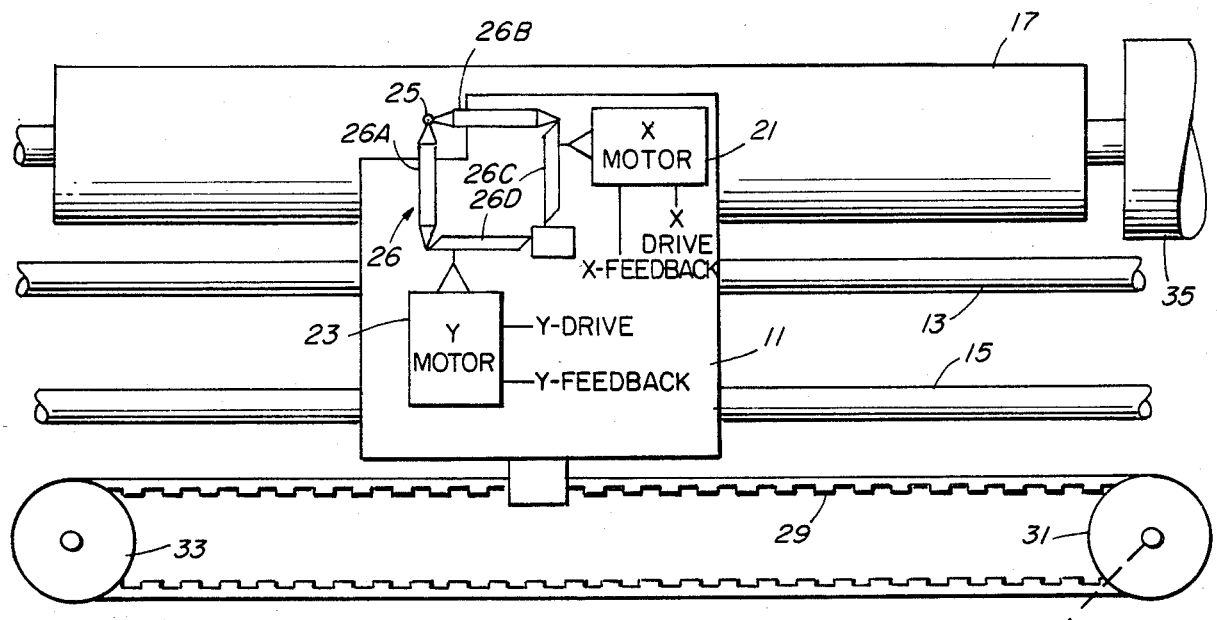
FIG. 1 is a diagram of a calligraphic writing mechanism used in the present invention.

Referring now to FIG. 1, a carriage mechanism is indicated generally by reference character 11. Carriage 11 is slideably mounted on a pair of rails 13 and 15 so as to be movable along a platen, indicated generally by reference character 17. Platen 17 may, for example, be of the character of a typewriter roller although a fixed platen, independent of the paper feed mechanism, could also be used.

Carriage 11 carries a pair of transducers or servomotors 21 and 23 which are adapted for moving or positioning a pen or stylus 25. The drive transducers are coupled to the stylus through a parallelogram flexure suspension 26 so that the servomotors move the stylus 25 along roughly transverse axes. This servomotor 21 moves the stylus in a direction generally parallel to the carriage motion (the X-axis) while the servomotor 23 moves the stylus in a generally vertical direction (the Y-axis). Each of the drive transducers 21 and 23 is responsive to a control or drive signal for moving the stylus along the respective transverse axis and includes also means for generating a feedback signal. In the presently preferred embodiment, optical feedback transducers are employed, similar to those described in the Brescia patent identified earlier. Carriage 22 will typically also include a third drive mechanism (not shown) for loading and unloading the stylus to effect writing or not and to vary the loading on the stylus.

At the outset, it may be noted that writing is effected by moving the carriage along the platen 17 past successive character positions and writing in each character position or cell by energizing the linear servomechanisms 21 and 23 to move the stylus 25 along in accordance with a set of vectors defining the character. The definition of these vectors is preferably stored in digital form in a suitable digital memory, e.g. a so-called read only memory, which may be readily interchanged to effect changing from one type font to another. The stylus 25 may be in the form of a pen to effect direct writing or, preferably, will press through a carbon film ribbon to effect writing on paper supported by platen 17.

The flexure suspension 26 comprise four arms 26A–26D arranged essentially in a parallelogram with flexible joints between each of the arms. Preferably, the suspension is constructed as a unitary light-weight plastic casting as taught in the Brescia patent, with the arms 26A–26D having beam-like cross sections and with their flexible membrane-like portions forming the flexible joints. The lower right-hand corner of the parallelogram is fixedly mounted on the carriage in 22 and the stylus is carried at the upper left-hand corner. The Y axis servomotor 23 drives the arm section 26D to produce an essential vertical movement while the X axis servomotor drives the arm 26C to provide an essentially horizontal movement of the stylus.

While the movements generated by the respective servomotors are essentially transverse or orthogonal, it will be understood by those skilled in the art that the movement produced by any one servomotor will, in fact, be curved or accurate due to the action of the linkage arms 26A and 26B. In other words, even if the X motor 21 were stationary, actuation of the Y motor 23 will produce stylus movement which is an arc having a radius determined by the length of the arm 26D. Similarly, movement of the stylus produced by the actuation of the X-axis motor alone, will produce arcuate motion of the stylus having a radius corresponding to the length of the arm 26A. Further, this arcuate characteristic would be present even if the servomotor were arranged to produce direct axial movement of the adjacent ends of the arms 26A and 26B, i.e. if the suspension only involved two arms rather than the four utilized in the full parallelogram suspension.

Carriage 11 is moved along the length of platen 17 by a d.c. servomotor 17 which drives a timing belt 29 passing over a pair of rollers 31 and 33. This is the means for providing movement along a row of characters, i.e. in the horizontal direction. Movement of the paper in the transverse direction, e.g. vertical, is provided by means of a stepping motor 35 which rotates the roller platen 17.

In order to provide a feedback mechanism for sensing movement of the carriage and for keeping track of its position, the servomotor 27 is provided with a shaft encoder 37. Encoder 37 is of the type providing square-wave signals in phase quadrature, as indicated at A and B, so that both motor speed and direction of rotation can be determined. Other types of encoders might also be used. The positional information signals A and B are provided to the overall control processor of FIG. 3 as control signals as well as to the servo control circuitry of FIG. 2.

Figure 3:
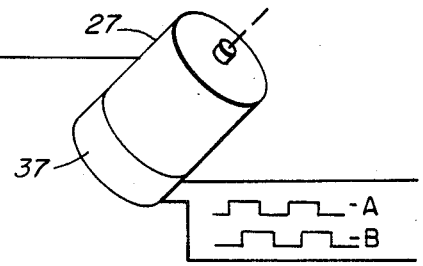
FIG. 3 is a block diagram of a generalized microcomputer system appropriate for providing data to the circuitry of FIG. 2 and for generally supervising operation of the apparatus.
Figure 3:
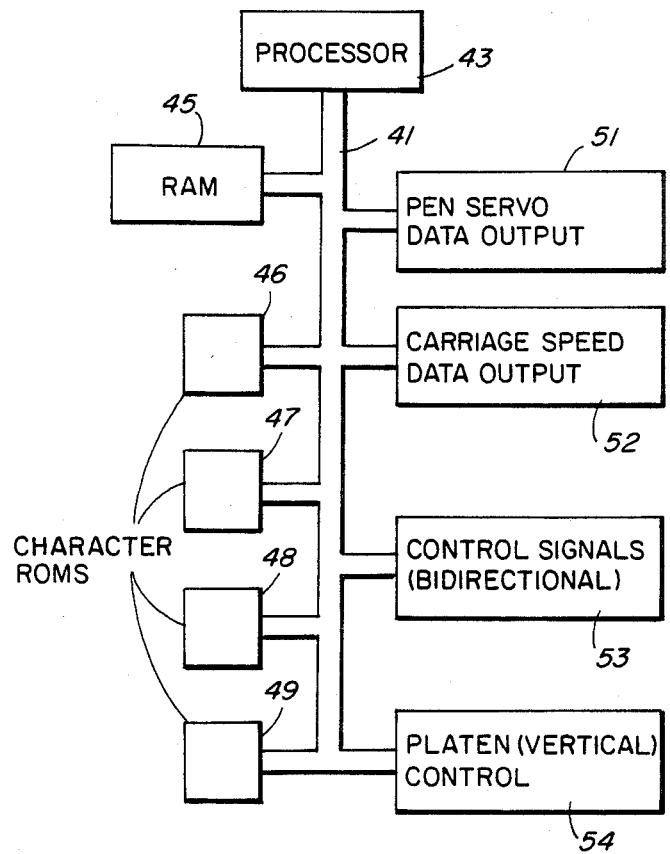

As indicated previously, the definitions of the vectors which make up each character are preferably stored in digital form in a read only memory and are then utilized by a microprocessor controller to generate the actual data which controls the stylus-driving servomechanims and the carriage drive. The general organization of this microprocessor system is illustrated in FIG. 3. The system illustrated is bus-oriented, that is, memory devices, I/O ports, and the processor are all connected to a common data and control bus. This bus is indicated generally by reference character 41, the processor itself being indicated at 43.

In one embodiment of the invention, processor 43 was an Intel 8085 microprocessor and the memory and I/O components were implemented using integrated circuits from the same family of devices. As is understood, the advantage of using a microprocessor-driven controller is that the mode of operation may be flexibly changed under software control, without extensive hardware redesign. In implementing its control function, the processor utilizes random access memory for storing operating parameters, such memory being indicated by reference character 45. Fixed data, i.e. data defining the vectors which make up each character in a font, is stored in so-called read only memory, such memories being indicated in FIG. 3 at reference characters 46–49.

Figure 2:
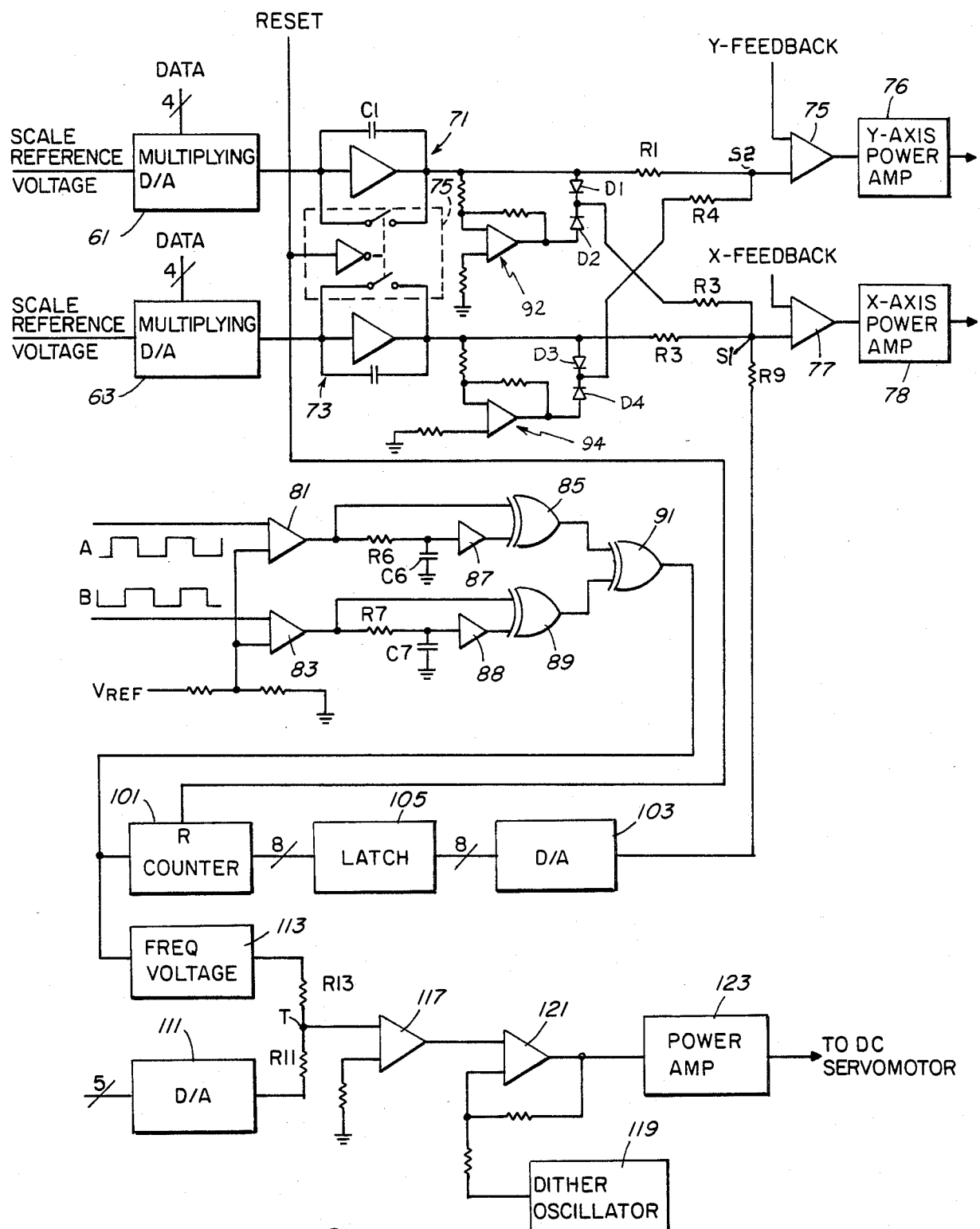
FIG. 2 is a schematic diagram of control circuitry employed in operating the mechanism of FIG. 2 in accordance with the present invention.

Ditigal data for defining the operation of the control circuitry of FIG. 2 is provided from the microprocessor system through latched output ports 51 and 52. Port 51 provides data for the pen servos while the port 52 provides carriage speed information. As is common to such systems, various control signals are needed by the processor to determine the state of the mechanism and various control signals are provided out to the mechanism controllers. A bi-directional port for this purpose is indicated by reference character 53. A third I/O port 54 is provided for vertical control, i.e. the controller which drives the stepping motor 35. However, this mechanism forms no part of the present invention and is not disclosed in detail herein.

Preferably, the vector defining data is stored in terms of direction and length of vector. Among the functions performed by the microprocessor system of FIG. 3 is to expand the data and generate respective X- and Y-axis components. These values are specified to four bits of accuracy each and are applied, respectively, to the digital to analog converters (DACs) 61 and 63 of FIG. 2. The values provided to the control circuitry represent velocity components. To get displacement values, the voltages obtained from the DACs 61 and 63 are integrated by the circuits indicated at 71 and 73, respectively. Each of these circuits comprises an inverting amplifier and an integrating capacitor, C1 and C3, respectively. The capacitors C1 and C3 can be discharged, i.e. to reset the integrators, by means of respective analog switches. The dual analog switch which performs this function, together with its control circuitry, is as indicated generally by reference character 75. The resetting switch circuitry 75 is operated by a control signal, designated RESET, which is one of the signals obtained from the control port 53 of the microprocessor controller of FIG. 3.

The output signals from the integrators 71 and 73 are applied, through respective weighting resistors R1 and R3, to error amplifiers 75 and 77. The error amplifiers 75 and 77 are responsive to th difference between the integrator output signals and the respective feedback signals obtained from the X and Y linear servomechanisms 21 and 23. The error amplifiers, in turn, drive, in conventional fashion, X- and Y-axis power amplifiers 76 and 78.

The quadrature output signals obtained from the shaft encoder 37 are each applied to the one input of a respective comparator 81 and 83. A suitable intermediate reference voltage is applied to the other input of each comparator. The output from comparator 81 is applied directly as one input to an exclusive OR gate 85 and, in delayed form, as the other input to gate 85. The delay is effected by a filter comprising a resistor R6 and capacitor C6, with squaring up being performed by a buffer gate 87. The function of this delay and gating circuitry is to provide, at the output of gate 85, a brief pulse for each transition, positive or negative, in the input signal A. A completely similar circuit provides, in response to the input signal B, a corresponding pulse train at the output of an exclusive OR gate 89. The pulse trains obtained from the gates 85 and 89 are combined in an exclusive OR gate 91. The output of this gate comprises a pulse for each transition in either of the input signals (A or B). In effect, a factor of four multiplication in the pulse rate is provided as compared with the pulse rate of either one of the input signals. If the carriage were driven by a stepper motor instead of the d.c. servomotor 27, the pulse signal used to advance that motor might be used in place of the pulse train generated by the shaft encoder 37.

The pulse train obtained from the gate 91 is applied to a counter 101 so that the counter generates a digital value which varies in proportional to displacement of the carriage. This counter 101 is reset along with the resetting of the integrators 71 and 73 at the start of each character. Thus, the digital value held by the counter in one sense represents displacement across the character position. The digital value in counter 101 is converted to an analog signal voltage by a digital to analog (D/A) converter 103, the transfer being buffered by a latch 105 which is loaded in synchronism with the counting to minimize ripple-through effects. In one sense, the output voltage from the D/A converter 103 comprises a ramp as the carriage moves across the platen. This ramp voltage, however, is not a time dependent function in the usual sense, but rather is proportional to actual displacement of the carriage and thus, in the time domain, will vary as the speed of the carriage varies.

The ramp voltage obtained from D/A converter 103 is mixed in or summed with the X axis position signal obtained from the integrator 73, the ramp signal being applied, through a resistor R9, to a summing junction S1 at the input of error amplifier 77. The addition of this carriage displacement component into the vector-defining voltage allows the writing of characters from the moving carriage without requiring alteration of the basic vector encoding scheme and, in a manner, allowing the velocity of the carriage to change.

In the embodiment illustrated, the axis of one of the linear servotransducers driving the stylus is parallel to the direction of carriage movement and the other axis is essentially perpendicular thereto. Accordingly, the displacement based compensation signal only needs to be mixed with one of the two control signals driving the servotransducers in order to obtain the desired moving frame of reference. On the other hand, those skilled in the art will appreciate that an arrangement could be utilized in which the axes of both linear servotransducers were at an angle, e.g. 45° to the direction of carriage movement, though perpendicular to each other. In such a case, displacement compensation components of appropriate magnitude would be summed with each of the servocontrol signals, observing appropriate polarity.

Selection of carriage speed is performed by the microprocessor system of FIG. 3, a data word representing the desired carriage speed being output through the port 52. This data, at five bits of accuracy, is applied to a digital-to-analog converter 111. The output signal from converter 111, which is an analog voltage representing desired speed, is compared with a voltage representing actual speed. This latter voltage is obtained by a frequency-to-voltage converter 113 driven by the pulse train from gate 91. As described previously, the pulse in this train is generated at a rate which is proportional to the speed of the carriage, being derived from the shaft encoder associated with the carriage drive motor 27. The output voltages from the frequency-to-voltage converter 113 and the D/A converter 111 are applied, through respective mixing resistors R11 and R13, to a summing junction T to derive an error signal. This error is amplified as indicated at 117. The amplified error signal is mixed with an a.c. component obtained from a dither oscillator 119 at the input of an amplifier 121 which, in turn, drives a power amplifier controlling the servomotor 27.

The embodiment illustrated includes provision for forming characters of different sizes from the same font data, i.e. the digital data being applied directly to the digital-to-analog converters 61 and 63. For this purpose, the converters are of the so-called multiplying type in which the output voltage is proportional, not only to the digital value applied, but also to a scale reference voltage which can be independently set for each of the two axes, preferably under control of the microprocessor program. Accordingly, since the horizontal and vertical scaling factors can be selected separately, characters of different aspect ratios can be formed from the same data as well as merely scaling the characters.

Associated with each position signal channel is a circuit for deriving a signal which is roughly a function of the absolute value of the respective position signal. The derived signal is then used to produce a compensating movement through the channel for the other axis in a manner which tends to cancel the arcuate characteristic imposed by the parallelogram stylus suspension. The circuitry for this purpose associated with the Y-axis channel include a unity-gain inverting amplifier circuit 92 and a pair of back-to-back diodes D1 and D2. Associated with the X-axis channel is similar circuitry including amplifier circuit 94 and diodes D3 and D4. As is understood by those skilled in the art, the signal available between the diodes D1 and D2 will be approximately equal to the absolute value of the Y-axis position signal, i.e. the output signal from the integrator 71. The definition is only approximate because the diodes D1 and D2 do not behave as perfect switches but rather have a finite forward voltage drop which behaves in a non-linear fashion. However, as explained hereinafter, this deviation from exact correspondence with absolute value improves rather than detracts from the desired compensation.

Figure 4A:
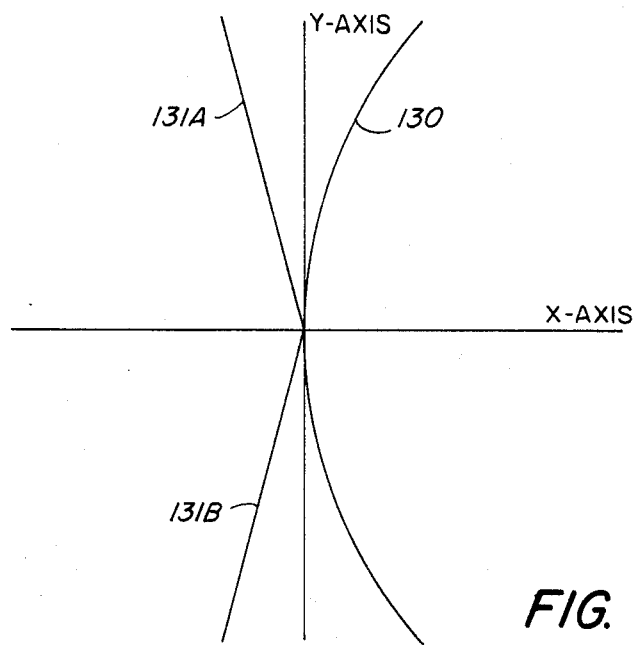
FIGS. 4A and 4B are diagrams illustrating arc compensation provided by the apparatus of FIGS. 1-3.

The compensating signal derived from the Y-axis channel, i.e. from between the diodes D1 and D2, is applied, through a weighting resistor R3, to the summing junction S1 so as to be mixed in with the control signal driving the X-axis servo motor. The value of R3 is selected empirically to achieve the best linearization under most operating conditions. The compensating signal derived from the X-axis channel, i.e. from between the diodes D3 and D4 is similarly mixed in with the Y-axis control signal being applied through weighting resistor R4 to a similar summing junction S2. The nature of the correction obtained by the practice of the present invention may be understood with reference to FIGS. 4A and 4B. In the drawings the arcuate distortion and the correction effects have been exaggerated for the purposes of explanation.

Figure 4B:
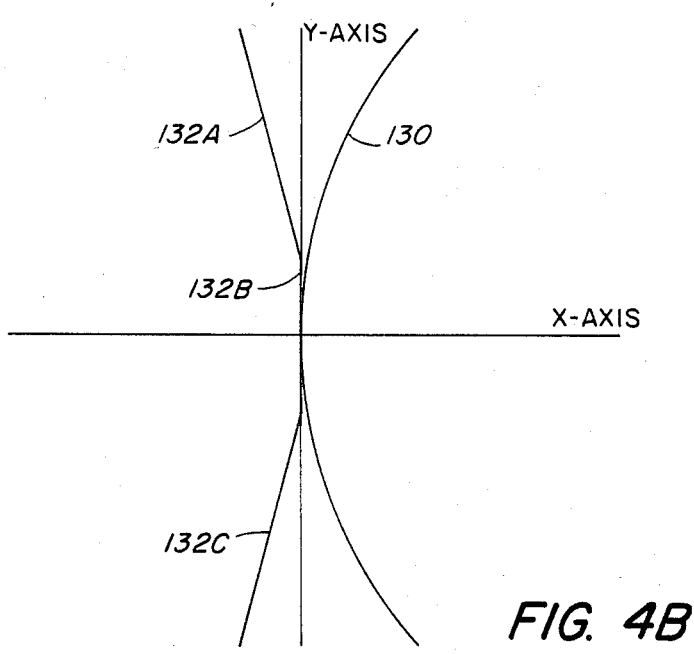

Assuming that only the Y-axis drive transducer is operated, the stylus would traverse an arc as represented by the line 130, the radius of the arc being determined essentially by the length of the stylus suspension arm 26B. A compensating signal (CX) for the X-axis derived according to the absolute value function $CX = A|Y|$ would produce a movement corresponding to the line 131, a line made up of two line segments 131A and 131B. The error would thus be only the difference between the sum of 130 and 131 and the vertical axis. Assuming that the resistor R3, which determines the value of A, is appropriately chosen, it can be seen that the error from straight line motion is greatly reduced. In fact, the error is further reduced using the actual circuitry of FIG. 2, owing to the finite forward voltage drop of the diodes. As a first approximation, this voltage drop in effect introduces a third line segment which bridges the apex between the straight lines representing the absolute value function. This effect is represented in FIG. 4B by the three line segments 132A, 132B and 132C which, as may be seen, more closely represents the complement of the basic arc which is to be compensated. Thus, an even greater degree of compensation is obtained.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

I claim:

1. A calligraphic character printer comprising:
   a print head assembly including a stylus;
   a suspension for permitting movement of said stylus relative the assembly, said suspension including at least a pair of generally orthogonal arms hinged together;
   for each arm, a drive transducer operative to move the stylus along an arc having a substantial curvature defined essentially by the length of the other arm;
   means for generating, from stored data, a pair of signals which represent stylus position along orthogonal axes relative said assembly;
   for each drive transducer, servo amplifier means for energizing that drive transducer responsive to the respective position signal;
   for each drive transducer, means for generating a compensation signal which is an function of the absolute value of the position signal corresponding to the other drive transducer and for mixing that compensation signal into the position signal which controls the energization of the respective drive transducer with a value to substantially offset the deviation from a straight line of said curvature.

2. A printer as set forth in claim 1 wherein the compensation signal generating means include for each position signal, a means for generating an inverted version of the position signal and a pair of diodes, said diodes being connected back-to-back for applying the greater of the position signal or its inverted version, through a weighting resistor, to the servo amplifier for the other drive transducer thereby to linearize the move of the stylus in response to the separate position signals.

3. A calligraphic character printer comprising:
   a print head assembly including a stylus;
   a suspension for permitting movement of said stylus relative the assembly, said suspension including at least a pair of generally orthogonal arms hinged together;
   for each arm, a drive transducer operative to move the stylus along an arc having a substantial curvature defined essentially by the length of the other arm;
   associated with each drive transducer, means for generating a respective feedback signal;
   means for generating, from stored data, a pair of signals which represent stylus position along orthogonal axes relative said assembly;
   for each drive transducer, servo amplifier means for energizing that drive transducer responsive to the difference between the respective position signal and the respective feedback signal;
   for each drive transducer, means for generating a compensation signal which is an approximate function of the absolute values of the position signal corresponding to the other drive transducer and for mixing that compensation signal into the difference value which controls the energization of the respective drive transducer with a value to substantially offset the deviation from a straight line of said curvature.

4. A calligraphic character printer comprising:
   a print head assembly;
   carriage means for transporting the print head assembly along a line of print, said print, head assembly including a stylus and a parallelogram flexure suspension for permitting movement of said stylus relative the assembly, said suspension including one pair of generally orthagonal arms meeting with the stylus at the apex;
   for each arm of said pair, a drive transducer operative to move the stylus along an arc defined essentially by the length of the other arm;
   associated with each drive transducer, means for generating a respective feedback signal;
   means for generating, from stored data, a pair of signals which represent stylus position along orthogonal axes relative said assembly;
   for each drive transducer, servo amplifier means for energizing that drive transducer responsive to the difference between the respective position signal and the respective feedback signal;
   for each position signal, a means for generating an inverted version of the position signal and a pair of diodes, said diodes being connected back-to-back for applying the greater of the position signal or its inverted version, through a weighting resistor, to the servo amplifier for the other drive transducer thereby to linearize the move of the stylus in response to the separate position signals;
   whereby the stylus is positioned as an essentially linear function of the position voltages.

* * * * *